(12) United States Patent
Barndt et al.

(10) Patent No.: US 10,198,313 B2
(45) Date of Patent: Feb. 5, 2019

(54) REDUNDANCY OF ERROR CORRECTION ENCODED DATA IN A STORAGE SYSTEM

(71) Applicant: HGST Netherlands B.V., Amsterdam (NL)

(72) Inventors: Richard David Barndt, San Diego, CA (US); Majid Nemati Anaraki, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/068,491

(22) Filed: Mar. 11, 2016

(65) Prior Publication Data

US 2017/0262332 A1    Sep. 14, 2017

(51) Int. Cl.
*G06F 11/00* (2006.01)
*G06F 11/10* (2006.01)
*G06F 11/07* (2006.01)

(52) U.S. Cl.
CPC ........ *G06F 11/1008* (2013.01); *G06F 11/073* (2013.01); *G06F 11/1012* (2013.01)

(58) Field of Classification Search
None
See application file for complete search history.

(56) References Cited

U.S. PATENT DOCUMENTS

| | | | |
|---|---|---|---|
| 8,321,597 B2 | 11/2012 | Yu et al. | |
| 8,402,217 B2 | 3/2013 | Burd | |
| 8,438,455 B2 | 5/2013 | Vogan et al. | |
| 8,700,950 B1 | 4/2014 | Syu | |
| 8,775,868 B2 | 7/2014 | Colgrove et al. | |
| 2009/0022242 A1* | 1/2009 | Waters | H04L 1/0041 375/299 |
| 2009/0241008 A1* | 9/2009 | Kim | G06F 11/1072 714/755 |
| 2010/0131806 A1* | 5/2010 | Weingarten | G06F 11/1072 714/54 |
| 2011/0090734 A1* | 4/2011 | Burger, Jr. | G06F 11/1072 365/185.03 |
| 2013/0024605 A1* | 1/2013 | Sharon | G06F 11/1072 711/103 |
| 2013/0042053 A1 | 2/2013 | Huang | |

OTHER PUBLICATIONS

Kim et al., "Enhancing SSD Reliability through Efficient RAID Support," APSys '12, Jul. 2012, retrieved from https://apsys2012.kaist.ac.kr/media/papers/apsys2012-final23.pdf, 6 pages.

* cited by examiner

*Primary Examiner* — Mujtaba M Chaudry
(74) *Attorney, Agent, or Firm* — Morgan, Lewis & Bockius LLP (57) ABSTRACT

A device that provides for redundancy of error correction encoded data includes at least one processor circuit. The at least one processor circuit is configured to perform error correction encoding on data items to generate corresponding codewords, where at least one of the data items may have a different length than at least one other of the data items and each of the codewords is the same length. The at least one processor circuit is further configured to generate a redundancy data item based at least in part on the codewords. The at least one processor circuit is further configured to write the codewords and the redundancy data item to separate blocks of at least one flash memory circuit.

16 Claims, 8 Drawing Sheets

REDUNDANCY OF ERROR CORRECTION ENCODED DATA IN A STORAGE SYSTEM

TECHNICAL FIELD

The present description relates generally to error correction coding including providing for redundancy of error correction encoded data.

BACKGROUND

In a flash memory system, redundant array of independent disks (RAID) techniques can be used to combine multiple flash components into a single logical unit, e.g. a stripe or a redundancy stripe, for the purposes of data redundancy or performance improvement. For example, an exclusive-or operation can be performed on codewords written to a set of blocks to generate redundancy data which is then written to an additional block. If one of the codewords is subsequently lost or otherwise cannot be properly decoded, the lost codeword can be recovered using the other codewords (assuming they can be correctly decoded), in conjunction with the redundancy data.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system for providing redundancy of error correction encoded data, data items that are to be written to a set of blocks of flash memory are first encoded into codewords using error correction coding (ECC), such as low-parity density check (LDPC) ECC. The length of each codeword is the same; however, the code rate used to generate each codeword may differ (or be the same) depending on, for example, the integrity of the block to which each codeword is being written. For example, if the integrity of the block is high (e.g. more impervious to bit errors), the code rate may be high, and if the integrity of the block is low (e.g. more susceptible to bit errors), the code rate may be low.

In the subject system, in order to provide for redundancy of the encoded data items, e.g. the codewords, a binary operation is performed on the encoded data items, e.g. an exclusive-or binary operation, to generate redundancy data (or parity data). Since each of the codewords is the same length, the subject system can generate the redundancy data without having to add any padding, e.g. zero padding, to any of the codewords, thereby conserving processing and power resources. In one or more implementations, the codewords and the generated redundancy data may collectively be referred to as a stripe or a redundancy stripe. Each of the codewords and the redundancy data may be written to separate blocks of the flash memory. The subject system can subsequently recover at least one of the codewords based at least on the redundancy data and the other codewords, assuming the other codewords can be properly decoded. Since the redundancy data is not encoded into a codeword, the redundancy data does not need to be decoded, thereby further conserving processing and power resources.

Figure 1:
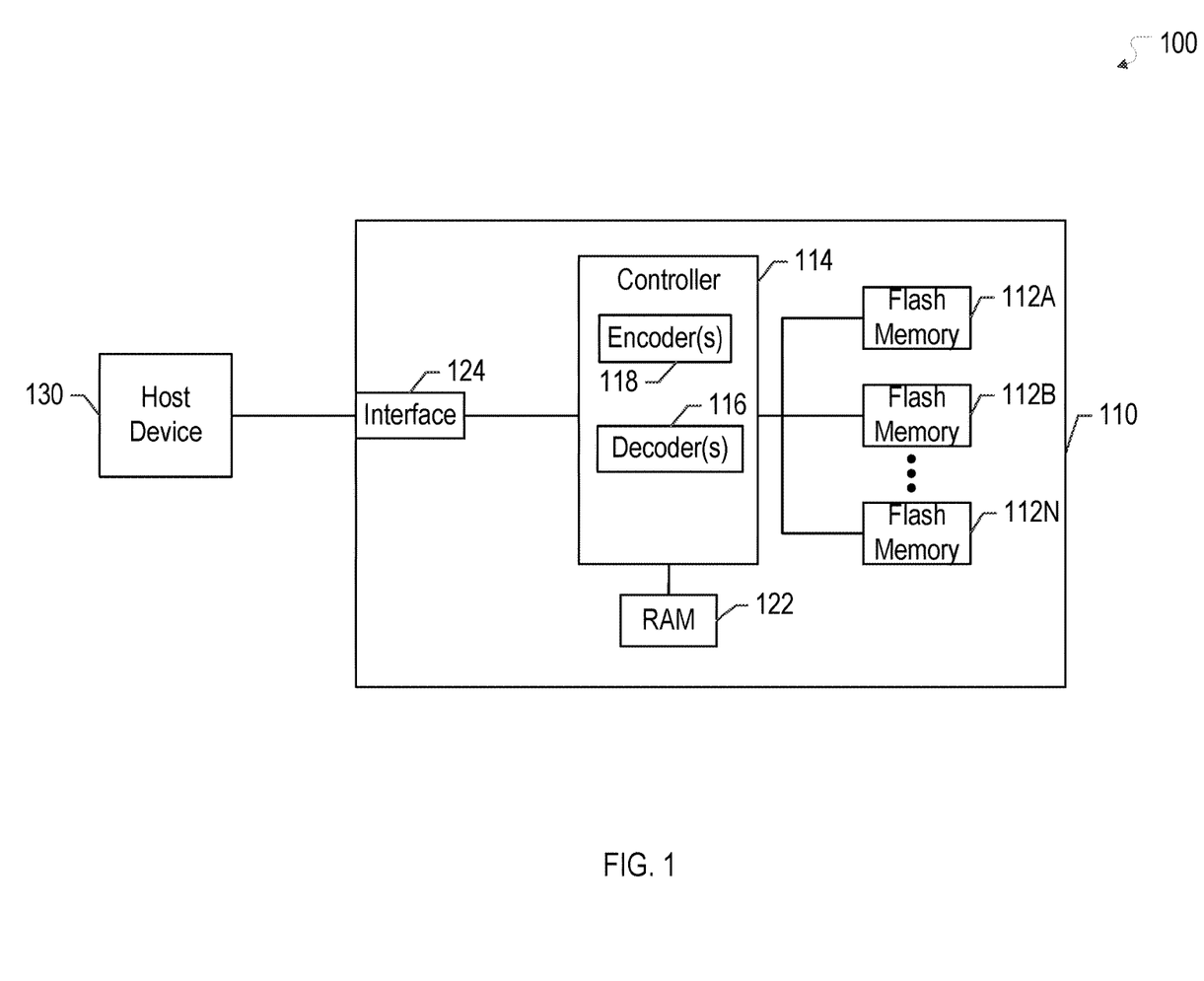
FIG. 1 illustrates an example flash memory system that may provide for redundancy of error correction encoded data in accordance with one or more implementations.

FIG. 1 illustrates an example flash memory system 100 that may implement a system for providing for redundancy of error correction encoded data in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The system 100 includes a flash memory device 110 and a host device 130. The flash memory device 110 includes one or more flash memory circuits 112A-N, a controller 114, a random access memory (RAM) 122 and an interface 124. The controller 114 includes one or more decoders 116, such as ECC decoders, and one or more encoders 118, such as ECC encoders. The one or more decoders 116 and/or the one or more encoders 118 may be one or more dedicated circuits of the controller 114 and/or may be implemented via firmware running on the controller 114.

The interface 124 of the flash memory device 110 couples the flash memory device 110 to the host device 130. The interface 124 may be a wired interface, such as a Personal Computer Memory Card International Association (PCMCIA) interface, a Serial AT Attachment (SATA) interface, a universal serial bus (USB) interface, or generally any wired interface. Alternatively, or in addition, the interface 124 may be a wireless interface, such as wireless SATA, Bluetooth, or generally any wireless interface.

The controller 114 is operable to read data from, and write data to, the flash memory circuits 112A-N. The flash memory circuits 112A-N may each include one or more blocks, such as NAND blocks and/or NOR blocks. The controller 114 may utilize the RAM 122 to assist with reading/writing data to/from the flash memory circuits 112A-N. For example, the RAM 122 may be used as a buffer for rate control, or may otherwise be used to store information (e.g. variables, logical to physical address mapping tables, endurance/retention data, settings, etc.) utilized by the controller 114 to read/write data to/from the flash memory circuits 112A-N. Since the RAM 122 may be volatile memory, the controller 114 may permanently store information in one or more of the flash memory circuits 112A-N. When the flash memory device 110 is powered on, the controller 114 may retrieve the information from the one or more flash memory circuits 112A-N and store the information in the RAM 122.

The controller 114 may implement one or more algorithms or techniques in conjunction with reading and/or writing data to the flash memory circuits 112A-N, such as security techniques (e.g. encryption), error correction coding techniques (e.g. LDPC), compression techniques, redundancy techniques (e.g. redundant array of independent disks (RAID) techniques), etc. For example, the controller 114 may use error correction coding in conjunction with redundancy techniques to provide protection to data written to the flash memory circuits 112A-N. In this regard, the encoder 118 of the controller 114 may encode a set of data items received from the host device 130 into a set of codewords at code rates indicated by the controller 114. The controller 114 then generates redundancy data from the set of codewords and writes each codeword and the redundancy data to separate blocks of the flash memory circuits 112A-N. In one or more implementations, the controller 114 writes each codeword and the redundancy data to separate flash memory circuits 112A-N, such that the failure of any one of the flash memory circuits 112A-N does not result in data loss. An example process generating redundancy data from encoded data items is discussed further below with respect to FIG. 2.

Since the integrity of the flash memory circuits 112A-N degrades with use over time, thereby increasing the raw bit error rate (RBER) associated with data read from the flash memory circuits 112A-N, the code rate used by the encoder 118 to encode each of the data items may differ depending on the integrity of the blocks to which the encoded data items are being written. For example, the flash memory circuits 112A-N may be designed to reliably perform a maximum number of data transfer operations, e.g. program-erase (P/E) cycles and/or read/write operations, and the integrity of the flash memory circuits 112A-N may degrade as the cycle count increases and/or the flash memory circuits 112A-N approach or surpass the maximum number of read and/or write operations. In order to account for this degradation over time/use, the controller 114 utilizes variable code rate error correction coding where the code rate used by the encoder 118 decreases as the integrity of the flash memory circuits 112A-N degrades, thereby providing additional protection to the data.

In order to determine the appropriate code rate to use for writing data to a given block, the controller 114 may monitor the integrity of the blocks of the flash memory circuits 112A-N. The monitoring may be based on, for example, the RBER associated with data read from the flash memory circuits 112A-N, and/or a priori empirical data regarding the life expectancy of the flash memory circuits 112A-N, e.g. the maximum number of reads and/or writes that the blocks of the flash memory circuits 112A-N are designed to reliably perform. When the controller 114 determines that the integrity of the blocks of the flash memory circuits 112A-N has degraded below a threshold amount, the controller 114 may change (e.g. decrease) the code rate used by the encoder 118 to perform the error correction coding. In one or more implementations, the controller 114 may store a table, such as in the RAM 122, that includes associations between different RBER thresholds and different code rates. In this manner the controller 114 can adaptively change the code rate as the monitored RBER changes.

When the controller 114 subsequently reads the codewords and redundancy data from the flash memory circuits 112A-N, the decoder 116 of the controller 114 can recover at least one lost codeword using the redundancy data and the other codewords, assuming they are decodable, as is discussed further below with respect to FIG. 3. The controller 114 then obtains the data items from the decoded codewords and provides the data items to the host device 130 via the interface 124.

In one or more implementations, one or more of the flash memory circuits 112A-N, the controller 114, the decoder 116, the encoder 118, the RAM 122, and/or the interface 124, and/or one or more portions thereof, may be implemented in software (e.g., firmware, subroutines, and/or code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, and/or any other suitable devices) and/or a combination of both.

Figure 2:
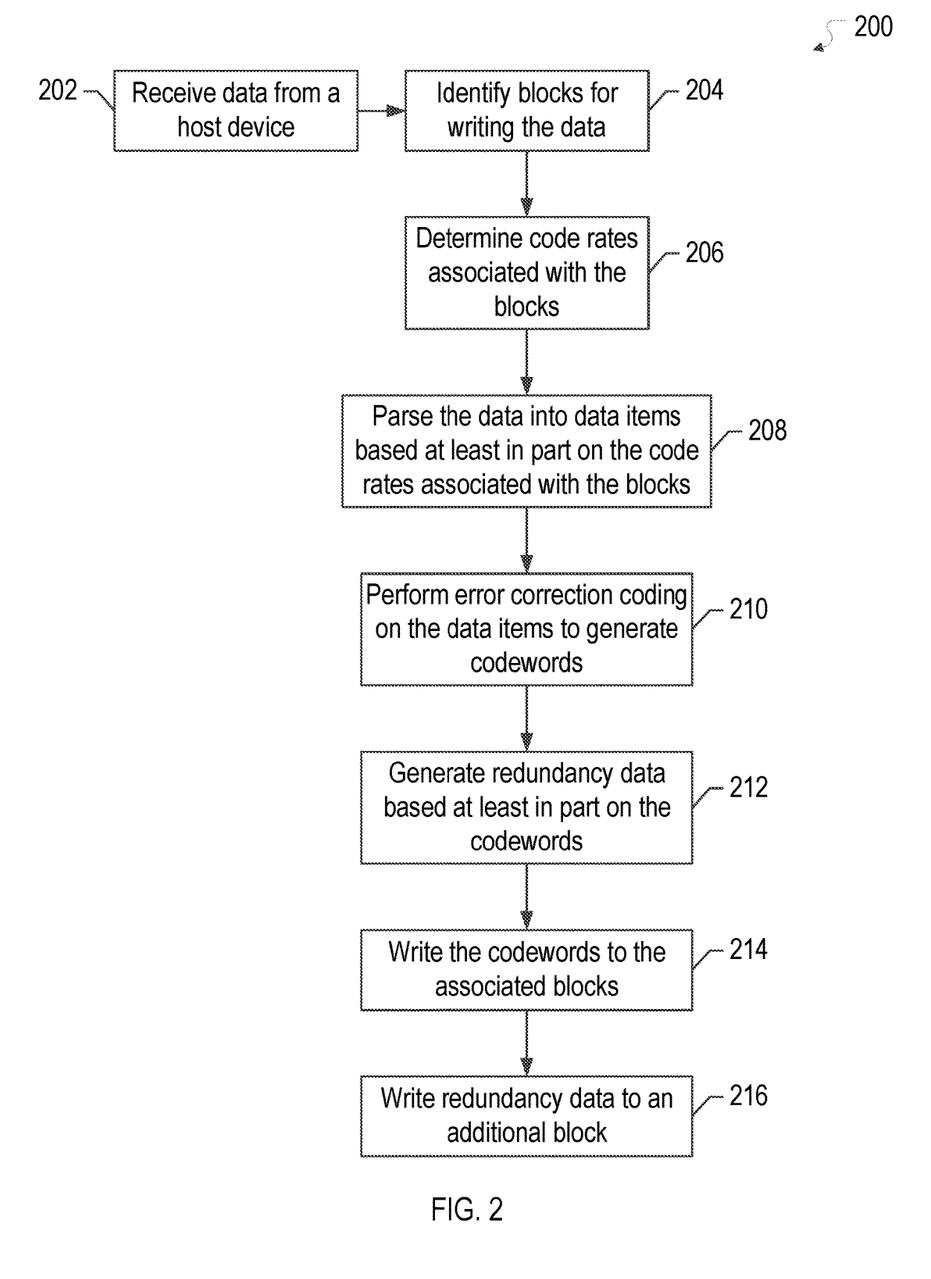
FIG. 2 illustrates a flow diagram of an example encoding process of a system for providing for redundancy of error correction encoded data in accordance with one or more implementations.

FIG. 2 illustrates a flow diagram of an example encoding process 200 of a system for providing for redundancy of error correction encoded data in accordance with one or more implementations. For explanatory purposes, the example process 200 is described herein with reference to the controller 114 and the encoder 118 of FIG. 1; however, the example process 200 is not limited to the controller 114 and/or the encoder 118 of FIG. 1, and one or more blocks of the example process 200 may be performed by one or more other components of the controller 114. Further for explanatory purposes, the blocks of the example process 200 are described herein as occurring in serial, or linearly. However, multiple blocks of the example process 200 may occur in parallel. In addition, the blocks of the example process 200 need not be performed in the order shown and/or one or more of the blocks of the example process 200 need not be performed.

The controller 114 receives data, such as a stream of data, from the host device 130 via the interface 124, where the data is to be written to one or more of the flash memory circuits 112A-N (202). The controller 114 may buffer some or all of the received data in the RAM 122. The controller 114 identifies a set of blocks to write the data to (204). Since the blocks of the flash memory circuits 112A-N degrade with use over time, the controller 114 may, for example, implement a wear-leveling or wear-balancing scheme to ensure that the blocks degrade substantially uniformly across the flash memory circuits 112A-N. Thus, the controller 114 may, for example, identify one or more available blocks that have less wear than an average block in the flash memory circuits 112A-N. The number of blocks in the set of blocks may depend upon the stripe size of the RAID technique being implemented by the controller 114. For example, for a stripe size of 32, there may be 31 blocks in the set of blocks used to store data and 1 additional block used to store redundancy data.

The controller 114 determines the code rates associated with the identified blocks, for example based at least in part on the integrity of the identified blocks (206). In one or more implementations, when the flash memory device 110 is powered on, or any time thereafter, e.g. periodically thereafter, the controller 114 determines the bit error rate associated with the one or more flash memory circuits 112A-N and/or of the individual blocks thereof. The controller 114 may determine the code rates associated with the identified blocks based at least in part on the bit error rates of the identified blocks and/or of the one or more flash memory circuits 112A-N containing the identified blocks. In one or more implementations, the stripe size may be based in part on the number of flash memory circuits 112A-N in the flash memory device 110.

The controller 114 parses the received data into data items based at least in part on the code rates associated with the blocks (208). Since the code rate may differ from block to block, resulting in a different amount of data that can be stored in each block, the controller 114 may segment the received data into data items of varying lengths. Example data items parsed from received data, such as a received data stream, are discussed further below with respect to FIGS. 4 and 8. The encoder 118 of the controller 114 then performs error correction coding, such as low-density parity check error correction coding, on the data items to generate encoded data items, e.g. codewords (210).

After encoding the data items into codewords, the controller 114 generates redundancy data based at least in part on the codewords, for example by performing a bitwise exclusive-or (XOR) operation on the codewords (212). Since the codewords are all encoded with the same length, the controller 114 can generate the redundancy data without having to add any padding, such as zero padding, to any of the codewords, thereby conserving processing and power resources. In one or more implementations, the redundancy data (P) can be determined using equation 1 below, where $C_i$ represents the codewords.

$$P = \sum_{i=1}^{31} C_i \qquad (eq.\ 1)$$

The controller 114 writes the codewords to the associated blocks of the flash memory circuits 112A-N (214). The controller 114 also writes the redundancy data to an additional block of the flash memory circuits 112A-N (216). Since the redundancy data is not a valid codeword, e.g. is not encoded using error correction coding, the redundancy data may be more susceptible to errors. Thus, the controller 114 may write the redundancy data to a block that has a highest integrity and/or that has an integrity that is equal to or greater than the highest integrity of any of the blocks storing the codewords.

Figure 3:
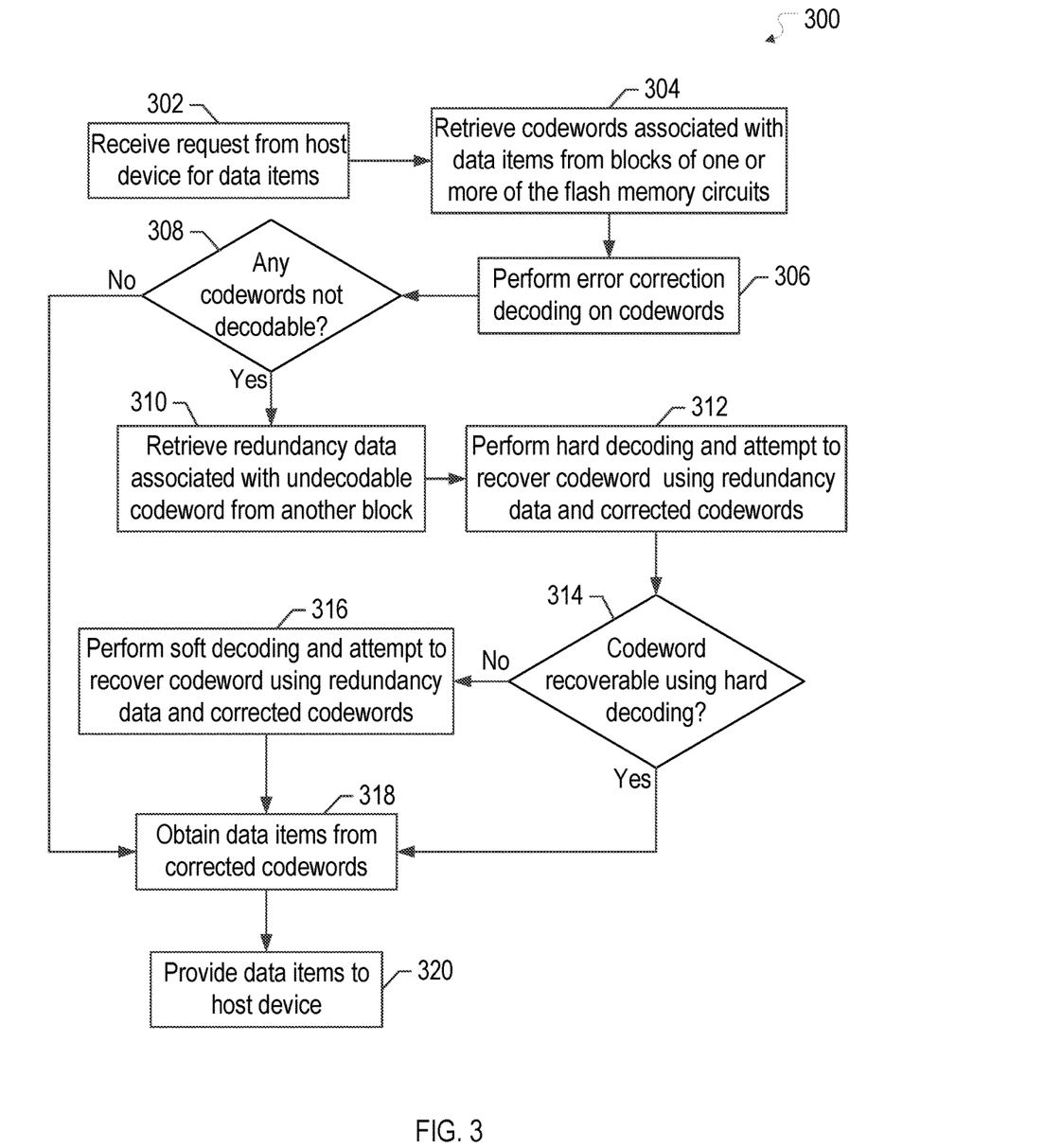
FIG. 3 illustrates a flow diagram of an example decoding process of a system for providing for redundancy of error correction encoded data in accordance with one or more implementations.

FIG. 3 illustrates a flow diagram of an example decoding process 300 of a system for providing for redundancy of error correction encoded data in accordance with one or more implementations. For explanatory purposes, the example process 300 is described herein with reference to the controller 114 and decoder 116 of FIG. 1; however, the example process 300 is not limited to the controller 114 and/or decoder 116 of FIG. 1, and one or more blocks of the example process 300 may be performed by one or more other components of the controller 114. Further for explanatory purposes, the blocks of the example process 300 are described herein as occurring in serial, or linearly. However, multiple blocks of the example process 300 may occur in parallel. In addition, the blocks of the example process 300 need not be performed in the order shown and/or one or more of the blocks of the example process 300 need not be performed.

The controller 114 receives a request from the host device 130 for one or more data items stored in one or more of the flash memory circuits 112A-N (302), such as via the interface 124. The controller 114 retrieves a set of codewords associated with the requested data items from the blocks of one or more of the flash memory circuits 112A-N (304). The decoder 116 of the controller 114 performs error correction decoding to decode and/or correct the retrieved codewords 306 (306). The controller 114 determines whether any of the codewords cannot be properly read from the blocks and/or cannot be properly decoded/corrected using error correction decoding (308). If the controller 114 determines that all of the codewords were properly read and decoded/corrected, the controller 114 obtains the data items from the corrected codewords (318) and provides the data items to the host device 130, e.g. over the interface 124 (320).

If the controller 114 determines that one of the codewords was not properly read from the associated block and/or was not decoded/corrected properly, the controller 114 retrieves the redundancy data associated with the undecodable codeword from another block of one of the flash memory circuits 112A-N (310). In one or more implementations, if the controller 114 has not already retrieved each codeword of the set of codewords associated with the retrieved redundancy data (e.g. each codeword of the redundancy stripe), the controller 114 retrieves, and the decoder 116 decodes, any remaining codewords of the redundancy stripe. Since the redundancy data is not an encoded codeword, the decoder 116 of the controller 114 does not attempt to decode/correct the redundancy data.

The controller 114 attempts to recover the undecodable codeword by performing hard decoding and then using the redundancy data and the other codewords that were properly read and decoded/corrected to attempt to recover the undecodable codeword (312). For example, the controller 114 may perform an XOR operation on the other codewords and the redundancy data to attempt to recover the codeword that could not be properly read and/or decoded/corrected.

In one or more implementations, the codeword that cannot be properly read and/or decoded may be represented by $C_k$, the other corrected codewords may be represented by $C_i$, and the redundancy data may be represented by P. In this instance, the estimated $C_k$, e.g. $C_k'$ may be obtained using equation 2 below and may then be decoded/corrected to obtain the codeword $C_k$.

$$C_k' = \sum_{\substack{i=1 \\ i \neq k}}^{31} C_i + P \Rightarrow C_k' = C_s + P' \qquad (eq.\ 2)$$

In equation 2, $C_s$ is an error free term that can be determined as:

$$C_s := \sum_{\substack{i=1 \\ i \neq k}}^{31} C_i,$$

and P' may be determined as: P'=P+e, where P is the correct redundancy data that was written to the flash memory circuit and e is the error added to P resulting from storage in the flash memory circuit. Since the redundancy data P is not a valid codeword, any errors that are generated from P will be added to the codeword $C_k$. Thus, since $C_k$ may have any of the possible code rates, in order to ensure that $C_k$ can be recovered, the redundancy data P should be written to the best available block, e.g. the available block with the highest integrity, and/or an available block having an integrity at least as high as the blocks storing the codewords associated with the redundancy data. In this manner, any errors generated in P that are added to $C_k$ will not exceed the correction capability of $C_k$. Furthermore, in some instances $C_k$ may be encoded at a lower code rate, resulting in a better performance/lower number of iterations when errors are produced in P, which is stored in the best available block.

If the controller 114 determines that the codeword is recoverable using hard decoding (314), the controller 114 obtains the data items from the corrected codewords (318) and provides the data items to the host device 130, e.g. over the interface 124 (320). If the controller 114 determines the codeword is not recoverable using hard decoding (314), the decoder 116 of the controller 114 attempts to recover the codeword by performing soft decoding and using the redundancy data and the decoded/corrected codewords to attempt to recover the undecodable codeword (316).

In soft decoding, the decoder 116 reads the block containing the redundancy data, P, multiple times to generate log likelihood values (LLR). The LLR values may be calculated based on data and/or tables related to the redundancy data P. In addition, LLR values corresponding to $C_k$ are also calculated from LLR values that correspond to P, e.g. using equations 3 and/or 4 below, equation 4 being a re-grouping of the elements of equation 3.

$$C'_k = C_s + d_e)  \quad (\text{eq. 3})$$

$$C'_k = (C_s + P) + d_e  \quad (\text{eq. 4})$$

In equation 3, $d_e$ is the distance of read cell voltage to its ideal location (e.g. the center of the distributions). For each bit i in the redundancy (or parity) data P, the LLR value $LLk^i_p$ is calculated using equation 5 below.

$$LLR^i_p = \log \frac{p(r_i | P^i = 0)}{p(r_i | P^i = 1)}  \quad (\text{eq. 5})$$

Figure 5:
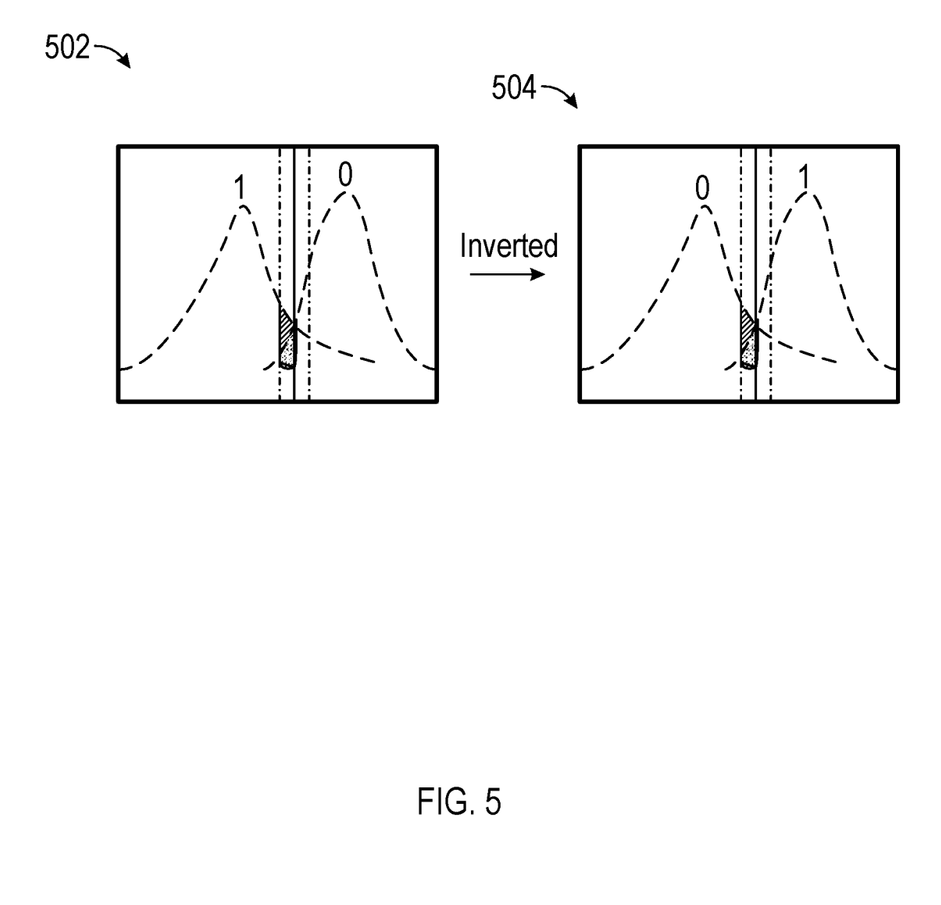
FIG. 5 illustrates a set of voltage distributions showing an inverted log likelihood ratio (LLR) in a system for redundancy of error correction encoded data in accordance with one or more implementations.

Since $d_e$ is the same component in both equations 3 and 4, the distributions stay the same. However, when $C_s=1$, the distributions are inverted, meaning that the corresponding distribution for $P^i=1$ will be related to P=0 and vice versa, as is shown in equations 6 and 7 below, and as is discussed further below with respect to FIG. 5.

$$\underline{C^i_s = 0:}$$

$$LLR^i_{C_k} = \log \frac{p(r_i | C^i_k = 0)}{p(r_i | C^i_k = 1)} = \log \frac{p(r_i | P^i = 0)}{p(r_i | P^i = 1)} = LLR^i_p  \quad (\text{eq. 6})$$

$$\underline{C^i_s = 1:}$$

$$LLR^i_{C_k} = \log \frac{p(r_i | C^i_k = 0)}{p(r_i | C^i_k = 1)} = \log \frac{p(r_i | P^i = 1)}{p(r_i | P^i = 0)} = -LLR^i_p  \quad (\text{eq. 7})$$

Figure 6:
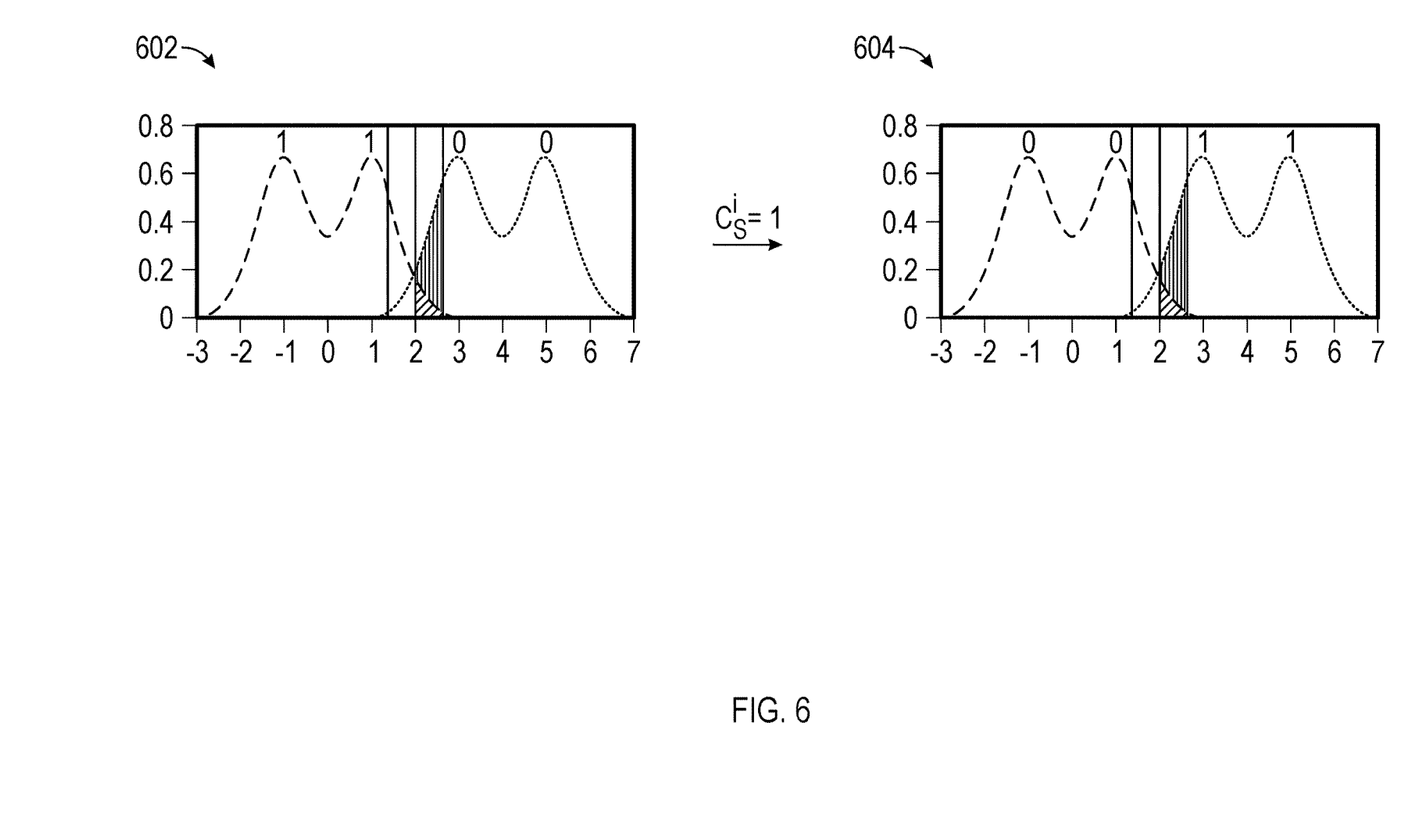
FIG. 6 illustrates a set of voltage distributions showing an inverted log likelihood ratio (LLR) in a system for redundancy of error correction encoded data in accordance with one or more implementations.
Figure 7:
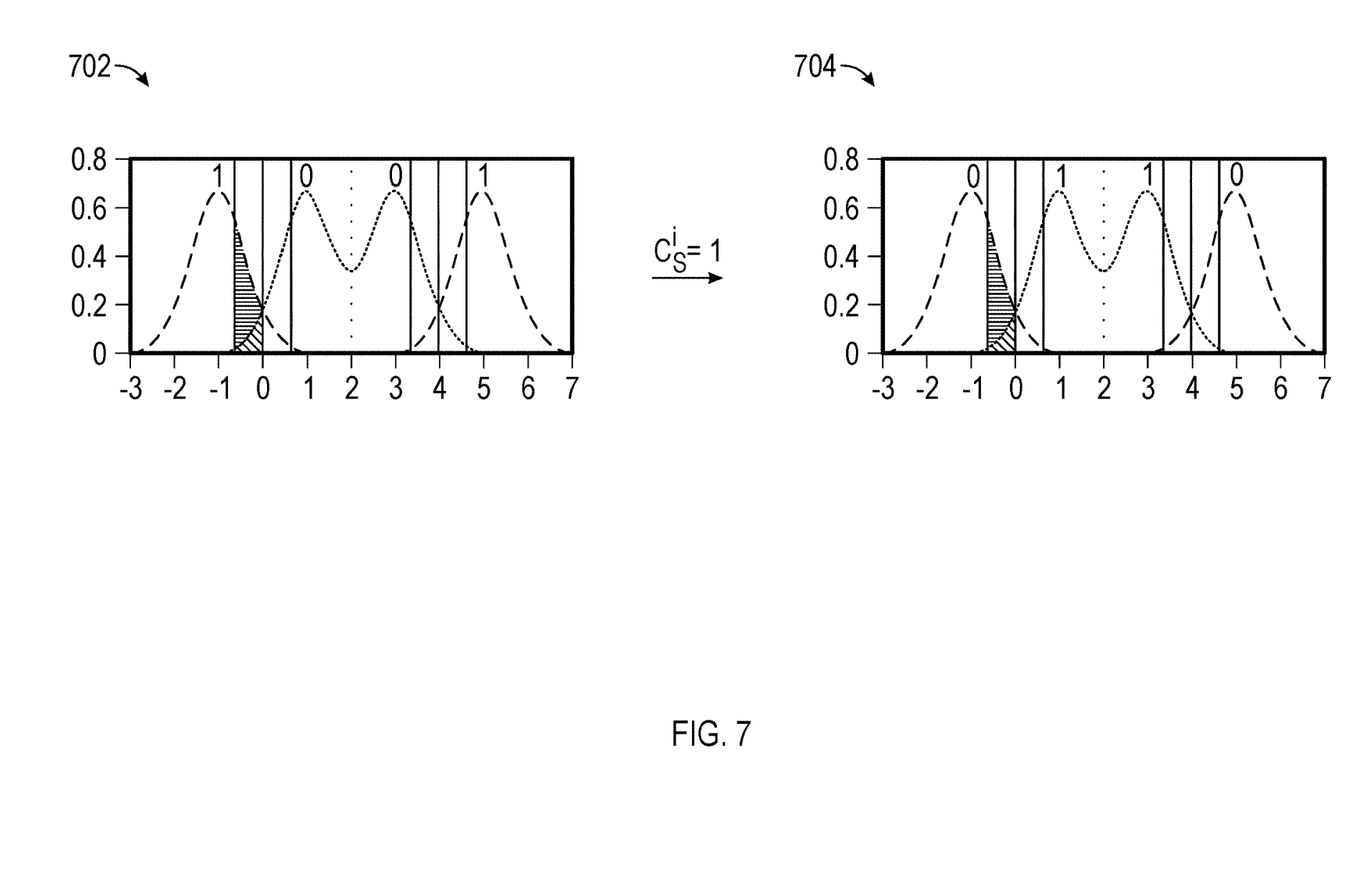
FIG. 7 illustrates a set of voltage distributions showing high page and low page LLR calculations in a system for redundancy of error correction encoded data in accordance with one or more implementations.

In one or more implementations, one or more of the flash memory circuits 112A-N may be and/or may include multi-level cells (MLCs). For MLC flash, the upper page and lower page LLRs are calculated and then, based on the value of $C_s^i$, the sign of the calculated LLR may need to be flipped in order to convert it to the code of $C_k$. FIGS. 6 and 7, which are discussed further below, illustrate the upper/lower page distribution inversion when $C_s^i=1$. In all cases, when $C_s^i=1$, the sign of calculated LLR for the corresponding bit should be flipped. The data item from $C_k$ are recovered after successful decoding of codewords with the obtained or inverted LLRs (318), and the data items are then provided to the host device 130 (320).

Figure 4:
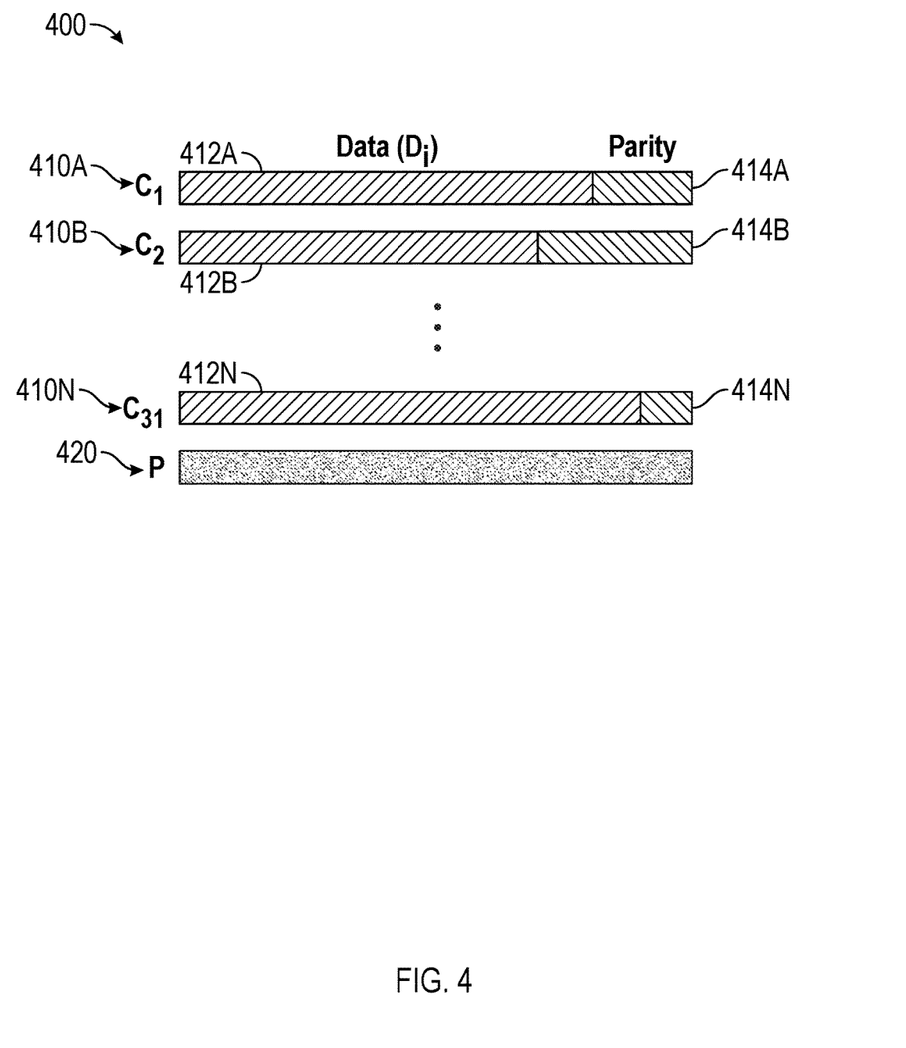
FIG. 4 illustrates an example redundancy stripe in a system for providing for redundancy of error correction encoded data in accordance with one or more implementations.

FIG. 4 illustrates an example redundancy stripe 400 in a system for providing for redundancy of error correction encoded data in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example redundancy stripe 400 includes a number of codewords 410A-N and redundancy (or parity) data 420. In the example redundancy stripe 400, the redundancy data 420 is generated after received data is encoded into the codewords 410A-N. The codewords 410A-N and the redundancy data 420 are each written to separate blocks of the flash memory circuits 112A-N. In one or more implementations, each of the codewords 410A-N and the redundancy data 420 may be stored on separate blocks of separate flash memory circuits 112A-N, such that the failure of any one of the flash memory circuits 112A-N does not result in data loss.

The codewords 410A-N may each include a data portion 412A-N (e.g. the parsed data received from the host device 130, and a parity portion 414A-N. Since the codewords may each be associated with different code rates, the lengths of one or more of the data portions 412A-N and/or one or more of the parity portions 414A-A may differ. However, each of the codewords 410A-N has the same codeword length. Since the redundancy data 420 is not encoded using error correction coding, the redundancy data 420 does not include separate data and parity portions.

FIG. 5 illustrates a set of voltage distributions 502, 504 showing an inverted log likelihood ratio (LLR) in a system for redundancy of error correction encoded data in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The first voltage distributions 502 are normal voltage distributions, while the second voltage distributions 504 are inverted voltage distributions. Thus, when $C^i_s=1$, the second (inverted) voltage distributions 504 are used as the reference to calculate the LLR values, and when $C^i_s=0$, the first (normal) voltage distributions 502 are used as the reference to calculate the LLR values.

FIG. 6 illustrates a set of voltage distributions 602, 604 showing an inverted log likelihood ratio (LLR) in a system for redundancy of error correction encoded data in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The first voltage distributions 602 are normal voltage distributions, while the second voltage distributions 604 are inverted voltage distributions. Thus, when $C^i_s=1$, the second (inverted) voltage distributions 604 are used as the reference to calculate the LLR values, and when $C^i_s=0$, the first (normal) voltage distributions 602 are used as the reference to calculate the LLR values.

FIG. 7 illustrates a set of voltage distributions 702, 704 showing high page and low page LLR calculations in a system for redundancy of error correction encoded data in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The first voltage distributions 702 are normal voltage distributions, while the second voltage distributions 704 are inverted voltage distributions. Thus, when $C^i_s=1$, the second (inverted) voltage distributions 704 are used as the reference to calculate the high page and low page LLR values, e.g. for MLC flash, and when $C^i_s=0$, the first (normal) voltage distributions 702 are used as the reference to calculate the high page and low page LLR values, e.g. for MLC flash.

Figure 8:
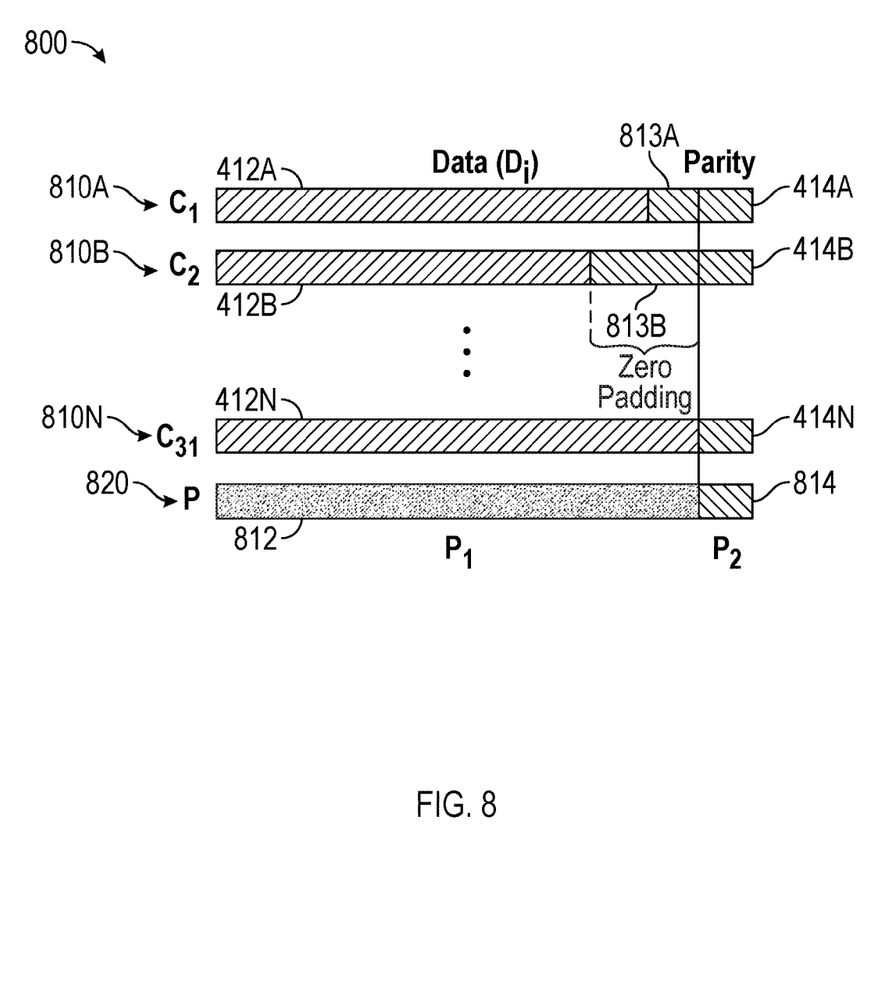
FIG. 8 illustrates an example redundancy stripe in a system for providing for redundancy of unencoded data in accordance with one or more implementations.

FIG. 8 illustrates an example redundancy stripe 800 in a system for providing for redundancy of unencoded data in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example redundancy stripe 800 includes a number of codewords 810A-N and redundancy (or parity) data 820. Each of the codewords 810A-N includes a data portion 412A-N and a parity portion 414A-N. The redundancy data 820 also includes a data portion 812 and a parity portion 814. In the example redundancy stripe 800, the data portion 812 of the redundancy data 820 is generated before performing error correction coding on the data portions 412A-N Since the data portions 412A-N of the codewords 810A-N may be of varying length (e.g. due to different code rates used to generate the codewords 810A-N), some of the data portions 412A-B may need to be padded, e.g. zero padded, in order to generate the data portion 812 of the redundancy data 820, e.g. to ensure that all of the data portions 412A-N are the same length. The zero padding is appended to the data portion 412A-N, e.g. by the controller 114, thereby requiring additional power and processing resources.

After the redundancy data 820 is generated, the zero padding 813A-B is removed by the controller 414, further requiring additional power and processing resources. The data portions 412A-N are then encoded to generate the parity portions 414A-N of the codewords 810A-N, and the data portion 812 of the redundancy data 820 is encoded to generate the parity portion 814 of the redundancy data 820. The codewords 810A-N and the redundancy data 820 are each written to separate blocks of the flash memory circuits 112A-N. In one or more implementations, each of the codewords 810A-N and the redundancy data 820 may be stored on separate blocks of separate flash memory circuits 112A-N, such that the failure of any one of the flash memory circuits 112A-N does not result in data loss.

Since zero padding 813A-B is added to some of the data items 810A-B to generate the redundancy data 820, in order to recover a lost codeword, each of the other codewords 810A-N needs to be corrected (as well as the redundancy data 820), and the zero padding 813A-B needs to be re-appended to the data items 810A-B. The lost codeword can then be recovered using hard and/or soft decoding. Thus, in one or more implementations, since the zero padding 813A-B needs to be added and removed during both encoding and decoding, and since the redundancy data 820 needs to be decoded in order to recover a lost codeword, recovering a lost codeword using the redundancy stripe 800 may utilize more power and/or processing resources than recovering a lost codeword using the redundancy stripe 400.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:

at least one processor circuit configured to:

determine a plurality of code rates for encoding data based on integrities of each of a plurality of separate flash memory blocks;

perform error correction encoding on a plurality of data items to generate a plurality of codewords, wherein at least one of the plurality of data items comprises a different length than at least one other of the plurality of data items and each of the plurality of codewords comprises a same codeword length;

generate a redundancy data item based at least in part on performing an operation using multiple codewords of the plurality of codewords;

write each of the plurality of codewords to a respective one of flash memory blocks of a respective one of flash memory circuits; and write the redundancy data item to at least one additional block in another flash memory circuit separate from the flash memory circuits, wherein the at least one additional block is separate from the flash memory blocks containing the plurality of codewords, and wherein an integrity of the at least one additional block is greater than a highest integrity of any of the plurality of separate flash memory blocks.

2. The device of claim 1, wherein the plurality of data items are encoded at a plurality of code rates and at least one of the plurality of data items is encoded at a different code rate than at least one other of the plurality of data items.

3. The device of claim 2, wherein the at least one processor circuit is further configured to:
receive a data stream from a host device; and
parse the data stream into the plurality of data items based at least in part on the plurality of code rates.

4. The device of claim 1, wherein at least one of the plurality of codewords is recoverable using the redundancy data item in conjunction with other codewords of the plurality of codewords.

5. The device of claim 1; wherein the at least one processor circuit is further configured to generate the redundancy data item based at least in part on performing a bitwise exclusive-or operation on the plurality of codewords.

6. A computer program product comprising instructions stored in a tangible computer-readable storage medium, the instructions comprising:
instructions to retrieve, from each of a plurality of flash memory blocks, an associated codeword of a plurality of codewords, wherein at least one of the plurality of codewords is encoded at a different code rate of a plurality of code rates than at least one other of the plurality of codewords, the plurality of code rates is determined based on integrities of the plurality of flash memory blocks, and each of the plurality of codewords comprises a same codeword length;
instructions to perform error correction decoding on each of the plurality of codewords to generate a plurality of corrected codewords;
instructions to identify at least one of the plurality of codewords that cannot be properly decoded;
instructions to retrieve, from another block that is separate from the plurality of flash memory blocks, a redundancy data item, wherein the another block is retrieved from a flash memory circuit separate from a plurality of flash memory circuits storing the plurality of flash memory blocks; and instructions to recover the at least one of the plurality of codewords that cannot be properly decoded based at least in part on the plurality of corrected codewords and the redundancy data item.

7. The computer program product of claim 6, wherein the instructions further comprise:
instructions to retrieve a plurality of data items from bath the recovered at least one of the plurality of codewords and the plurality of corrected codewords; and
instructions to provide the plurality of data items to a host device.

8. The computer program product of claim 7, wherein at least one of the plurality of data items comprises a different length than at least one other of the plurality of data items.

9. The computer program product of claim 6, wherein the redundancy data item is not a valid codeword.

10. The computer program product of claim 6, wherein the error correction decoding comprises low-density parity check error correction decoding.

11. A method comprising:
determining, for each block of a plurality of flash memory blocks, an associated code rate of a plurality of code rates based on an integrity of the flash memory block;
identifying, for each block of the plurality of flash memory blocks, a data item of a plurality of data items; the data item having a length that is determined based at least in part on the associated code rate of the plurality of code rates;
performing, on each data item of the plurality of data items; error correction encoding to generate, for each block of the plurality of flash memory blocks; an associated codeword of a plurality of codewords;
generating a redundancy data item based at least in part on each of the plurality of codewords;
writing, to each block of the plurality of flash memory blocks on a respective one of a plurality of flash memory blocks, the associated codeword; and
writing, to at least one additional block that is separate from the plurality of flash memory blocks, the redundancy data item without performing error correction encoding on the redundancy data item, wherein the at least one additional block is written to another flash memory circuit that is separate from the plurality of flash memory blocks, and wherein an integrity of the at least one additional block is greater than a highest integrity of the plurality of flash memory blocks.

12. The method of claim 11, wherein a first code rate of the plurality of code rates associated with a first block of the plurality of flash memory blocks is different than a second code rate of the plurality of code rates associated with a second block of the plurality of flash memory blocks.

13. The method of claim 12, wherein each of the plurality of codewords has a same codeword length.

14. The method of claim 11, wherein at least one of the plurality of codewords is recoverable from other codewords of the plurality of codewords and the redundancy data item.

15. The method of claim 11, wherein generating the redundancy data item based at least in part on each of the plurality of codewords further comprises generating the redundancy data item based at least in part on performing a bitwise exclusive-or operation on each of the plurality of codewords.

16. The method of claim 11, further comprising:
receiving a data stream from a host device; and
parsing the data stream into the plurality of data items.

* * * * *